US005755993A

United States Patent [19]

Heffner et al.

[11] Patent Number: 5,755,993

[45] Date of Patent: May 26, 1998

[54] PEROXYGEN BLEACH COMPOSITION ACTIVATED BY PIPERIDONE DERIVATIVES

[75] Inventors: Robert Joseph Heffner; Robert John Steltenkamp, both of Somerset, N.J.

[73] Assignee: Colgate-Palmolive Co., New York, N.Y.

[21] Appl. No.: 774,285

[22] Filed: Dec. 23, 1996

Related U.S. Application Data

[60] Provisional application Nos. 60/009,426, Dec. 28, 1995 and 60/011,486, Feb. 12, 1996.

[51] Int. Cl. $^6$ .............................. C09K 3/00; C11D 3/39; C11D 7/38; D06L 3/02

[52] U.S. Cl. .......................... 252/186.39; 510/313; 8/111; 134/42

[58] Field of Search .......................... 252/186.38, 186.39; 510/312, 313; 8/111; 134/42

[56] References Cited

U.S. PATENT DOCUMENTS

| | | | |
|---|---|---|---|
| 3,822,114 | 7/1974 | Montgomery | 8/111 |
| 4,006,092 | 2/1977 | Jones | 8/111 |
| 4,316,812 | 2/1982 | Hancock et al. | 510/304 |
| 4,820,437 | 4/1989 | Akabane et al. | 252/186.39 |
| 5,374,729 | 12/1994 | Galbo | 546/242 |
| 5,405,413 | 4/1995 | Willey et al. | 8/111 |
| 5,635,103 | 6/1997 | Willey et al. | 510/313 |
| 5,654,269 | 8/1997 | Dankowski et al. | 510/313 |

FOREIGN PATENT DOCUMENTS 9514759 6/1995 WIPO .

*Primary Examiner*—Joseph D. Anthony
*Attorney, Agent, or Firm*—Bernard Lieberman; James M. Serafino

[57] ABSTRACT

Bleaching compositions comprising a bleaching compound and an N-acyl-3- or 4-piperidone each preferably present in a range of about 1 to about 75% by weight. Additives, such as, surfactants, anti-foaming agents, fabric softeners, stabilizers, inorganic builder salts, buffers, enzymes and the like may also be present. The compositions can be formulated as dry concentrated mixtures encapsulated or in loose powder form, aqueous solutions, aqueous solutions containing non-aqueous solvents and like forms. The compositions are effective as bleaching agents from below room temperature to higher temperatures, biodegradable and environmentally safe.

22 Claims, No Drawings

PEROXYGEN BLEACH COMPOSITION ACTIVATED BY PIPERIDONE DERIVATIVES

BACKGROUND OF THE INVENTION

This application claims the benefit of U.S. Provisional Applications Nos.: 60/009,426 filed Dec. 28, 1995 now abandoned, 60/011,486 filed Feb. 12, 1996 now abandoned.

1. Field of the Invention

This invention relates to bleach compositions containing a peroxygen bleaching compound. More particularly it relates to bleaching compositions containing inorganic peroxygen compounds activated with derivatives of piperidone.

2. Description of the Related Art

Bleaching compositions have been used in the home and in industrial applications for bleaching stains on hard surfaces and soiled fabrics. Hypochlorite bleaches are effective in removing such stains, when used in relatively high concentrations, but hypochlorite, along with other active chlorine bleaches, cause severe damage to fabric colors as well as to the textile fibers. Furthermore, hypochlorite liquid bleaches present handling and packaging problems. Color and fabric damage can be minimized by using milder oxygen bleaches, such as, sodium perborate or potassium monopersulfate. The stain removal characteristics of these peroxygen bleaches, however, are much less desirable than those of the harsher halogen bleaching agents. As a result, commercial bleeding compositions that contain peroxygen bleaches commonly employ activators, i.e., compounds that enhance the performance of the peroxygen bleaches. Bleaching compositions containing different types of bleach activators are known in the art including such compounds as esters, carboxylic acid anhydrides, quaternary ammonium salts and carboxylic acid salts. In addition, U.S. Pat. No. 5,437,686 discloses an inorganic peroxygen compound and a bicyclic or tricyclic diketone as an activator for the peroxygen compound.

U.S. Pat. No. 3,822,114 discloses a process for the activation of peroxygen bleaching agents which comprises conjointly dissolving in aqueous solution certain peroxygen bleaching agents, certain aldehyde or ketone bleach activators and buffering agents. Concentrated dry bleach compositions containing these compounds are also disclosed. Among a host of other ketones there is also taught the use of certain piperidone compounds.

Despite the effectiveness of prior bleach activators for use in the cleaning of fabrics and hard surfaces, there is still a need for more efficient activators which are fabric safe and environmentally friendly.

There is also a need for detergent bleach compositions.

It is therefore an object of this invention to provide improved bleaching compositions for use in the room temperature bleaching and/or removal of stains from fabrics and hard surfaces.

It is also an object of this invention to provide bleaching compositions that do not transfer dyes from one fabric to another during the laundering process.

It is still another object to provide bleaching compositions that are environmentally friendly.

Another object is to provide activators for enhancing the efficiency of peroxygen bleaches.

It is also an object of this invention to provide bleaching compositions having detergent properties.

Other objects will become apparent to those skilled in the art upon a further reading of the specification.

SUMMARY OF THE INVENTION

The objects presented above have been satisfied by a peroxygen bleaching composition which comprises a mixture by weight of:

(1) about 1 to about 75% of a peroxygen bleaching compound; and (2) about 1 to about 75% of a peroxygen bleaching compound activator having the formula:

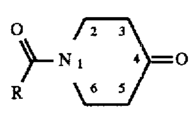

wherein the carbonyl function can be at either the 3 or 4 position of the piperidone ring, R is hydrogen, an aryl monovalent group having 6 to about 10 carbon atoms, an alkyl having 1 to about 18 carbon atoms, alkaryl or aralkyl group having about 7 to about 20 carbon atoms, or a nitrogen substituted hydrocarbyl group, and the piperidone ring carbon atoms can be mono- or disubstituted by one or more groups defined by R.

The peroxygen bleaching compositions of this invention can be used directly or in aqueous solution to bleach a fabric or in the alternative the bleaching compositions can be incorporated as an additive to a cleaning composition, such as, a powdered laundry detergent, a non-aqueous laundry detergent, a scouring powder, a hard surface cleaning composition, a powdered automatic dish washing composition, a non-aqueous automatic dish washing composition, a hair bleaching composition, a wound cleansing composition, a dental cleansing composition, a paper bleaching composition, a prespotter and the like.

DETAILED DESCRIPTION OF THE INVENTION

The present invention is directed to peroxygen bleaching compositions, and bleaching and/or stain removal processes carried out in an aqueous solution. These peroxygen bleaching compositions exhibit many practical utilities both domestic and industrial. For example, the bleaching compound-activator compositions can be used alone or in combination with other conventional ingredients to effect (1) direct bleaching of stains on fabrics, (2) removal by bleaching of stains found on hard surfaces, and (3) inhibition of the transfer to fabrics of solution or suspended dyes found in fabric laundering solutions.

The bleach compositions of the instant invention comprise a mixture of a peroxygen bleaching compound, preferably a monoperoxysulfate and more preferably potassium monoperoxysulfate and a piperidone derivative peroxygen bleaching compound activator, in a weight ratio of peroxygen bleaching compound to peroxygen bleaching compound activator of about 1:1 to about 100:1, preferably about 1:1 to about 50:1, and most preferably of about 1:1 to about 10:1. The piperidone derivatives used herein are N-acyl 3- or 4-piperidones having the formula shown above.

The bleaching compounds used in the instant invention are inorganic peroxygen salts, organic peroxygen acids and their water soluble salts. Examples of inorganic peroxygen salts include the water-soluble monopersulfates and water-soluble monoperoxyphosphates. Specific examples of such salts include sodium monopersulfate, potassium monopersulfate, disodium monoperphosphate, and dipotassium monoperphosphate. Highly preferred peroxygen salts, namely, those which are most highly activated by the piperidone derivative activators used in the instant invention are the sodium and potassium monopersulfates having the generic formulae $NaHSO_5$ and $KHSO_5$ respectively. Potassium monopersulfate is available commercially from E. I. duPont de Nemours and Company, Inc. under the trade name "Oxone". Oxone contains approximately 41.5% by weight $KHSO_5$ with the balance being $KHSO_4$ and $K_2SO_4$ in about equal proportions.

Peroxyacids which are suitable in the instant invention have the general formula:

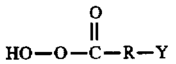

wherein R is an alkylene group containing from 1 to about 16 carbon atoms or an arylene group containing from 6 to about 8 carbon atoms and Y is hydrogen, halogen, alkyl, aryl or any group which provides an anionic moiety in aqueous solution. Y includes the following structures:

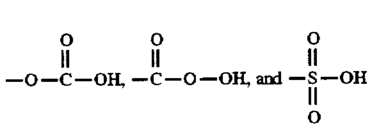

The organic peroxyacids or salts thereof suitable for use in this invention can contain either one or two peroxy groups and can be either aliphatic or aromatic. When the organic peroxyacid is aliphatic, the unsubstituted acid has the general formula:

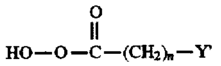

wherein Y' can be:

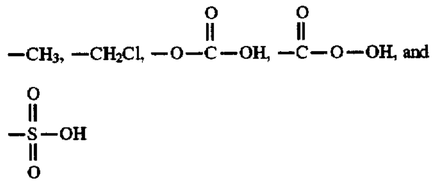

Preferred aliphatic peroxyacids include diperazelaic acid and diperadipic acid.

When the organic peroxyacid is aromatic, the unsubstituted acid has the general formula:

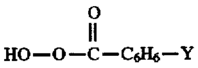

wherein Y is as defined above.

Examples of suitable aromatic peroxy acids or salts thereof include monoperoxyphthalic acid, diperoxyterephthalic acid, 4-chloroperoxyphthalic acid and the monosodium salt of diperoxyterephthalic acid. A preferred aromatic peroxyacid is diperoxyisophthalic acid. Mixtures of the peroxygen salt compounds and the peroxyacids can also be employed in the instant invention.

The concentration of the peroxygen bleaching compound in the compositions of this invention is about 1 to about 75% by weight, preferably about 5 to about 60% by weight and most preferably about 5 to about 50% by weight. The concentration of the peroxygen bleaching compound is at a sufficient level in the bleaching composition to provide about 1 ppm to about 1000 ppm, when the composition is contacted with and dissolved in water at room temperature or higher.

It is believed that the bleaching system acts through a mechanism first involving the reaction of an acylpiperidone with a peroxygen bleaching compound, such as, a monoperoxysulfate upon contact with water to form a dioxirane intermediate. The intermediate then reverts back to the original acylpiperidone liberating nascent oxygen at the same time functioning in the bleaching operation. Because of the reversion, the acylpiperidone may be considered as a catalyst since it is not consumed in the process.

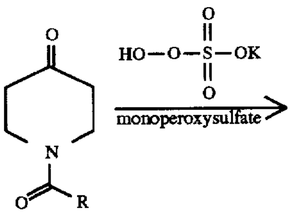

Acylpiperidone

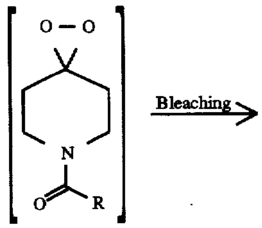

Dioxirane Intermediate

The acylpiperidones of this invention are stable solids having a melting point of at least 25° C. that can be conveniently post blended with the conventional powder detergents of bleach additives, unlike liquid peroxy bleach activators. Additionally, these peroxygen bleaches of the instant invention have the advantage that they are fully activated in the presence of water over a broad range of temperatures from below room temperature to higher temperatures; are stable solids resistant to hydrolysis and are biodegradable leaving no nitrogen residues and thus are environmentally safe and acceptable.

The concentration of the dioxirane formed from these acylpiperidones in use in the water is about 1 to about 10,000 parts per million (ppm), more preferably about 1 to about 5,000 ppm and most preferably about 1 to about 1,000 ppm.

The peroxygen bleaching composition which can be used directly in water or as an additive in a fully formulated cleaning composition comprises the oxygen bleaching compound and the peroxy bleach activator in a weight ratio of bleaching compound to bleach activator of about 1:1 to about 100:1, preferably about 1:1 to about 50:1 and most preferably about 1:1 to about 10:1. The peroxygen bleaching composition can be utilized as an additive to a fully formulated composition at a concentration level of about 1 to about 75% by weight preferably about 6 to about 60 weight % and most preferably about 5 to about 50 weight % depending upon the kind of cleaning composition.

In order to improve the storage shelf life of the peroxygen bleaching composition, either the peroxygen bleaching compound, the monopersulfate for example, or the piperidone bleach activator can be encapsulated using any of the known encapsulating techniques and agents which are water soluble at a preselected temperature.

A typical powder form automatic dishwashing composition (by weight) containing the claimed peroxygen bleach composition comprises:

(1) 20–70% of a detergent builder salt (2) 5–40% of an alkali metal silicate (3) 0–30% of an alkali metal carbonate (4) 0–6% of an anionic or nonionic surfactant (5) 0–6% of a foam depressant (6) 0–4% of an antifilming agent (silica, alumina or $TiO_2$)

(7) 0–20% of a low molecular weight polyacrylic acid (8) 0–20% of at least one enzyme (9) 1–75% of a peroxygen bleach compound, and

(10) 1–75% of a claimed acylpiperidone as a bleach activator

A typical nonaqueous liquid automatic dishwashing composition (by weight) comprises:

(1) 3–20% of an alkali metal silicate (2) 0–15% of a clay gel thickener (3) 0–1% of an hydroxypropylcellulose polymer (4) 0–25% of a low molecular weight polyacrylate (5) 0–15% of a liquid nonionic surfactant (6) 2–15% of an alkali metal carbonate (7) 0–7% of a stabilizing system (8) 0–25% of an alkali metal citrate (9) 0–20% of at least one enzyme

(10) 0–20% of a nonaqueous liquid carrier

(11) 1–75% of a peroxygen bleaching compound, and

(12) 1–75% of a claimed acylpiperidone bleach activator

A typical powder form detergent composition (by weight) comprises:

(1) 0–25% of at least one nonionic surfactant (2) 0–25% of at least one anionic surfactant (3) 0–40% of a zeolite (4) 5–45% of at least one builder salt (%0 0–5% of a polyethylene glycol (6) 0–10% of an alkali metal silicate (7) 0–10% of a low MW polyacrylate (8) 0–30% of an alkali metal sulfate (9) 1–75% of a peroxygen bleaching compound, and

(10) 1–75% of a claimed acylpiperidone bleaching compound activator

An exemplary nonaqueous laundry detergent comprises (by weight):

(1) 20–70% of a nonionic surfactant (2) 0.5–20% of a nonaqueous solvent (3) 10–60% of at least one builder salt (4) 0.5–1.5% of a foam depressant (5) 1–75% of a peroxygen bleaching compound, and (6) 1–75% of a claimed acylpiperidone bleach activator A typical scouring powder composition suitable for removing stains from hard surfaces comprises by weight:

(1) 90.85% of White Silex (2) 2.0% of a detergent (3) 6.0% of Soda Ash (4) 1.0% of the claimed acylpiperidone (5) 0.15% of perfume A typical nonconcentrated powdered bleach composition comprises by weight:

(1) 1–75% of Potassium Monopersulfate (2) 1–75% of the claimed acylpiperidone (3) 2–15% of Sodium Carbonate (soda ash)

(4) 0–50% Silex

The invention is further described in the examples that follow. All parts and percentages are by weight unless otherwise specified.

The bleach activator process of the instant invention is carried out in aqueous solution having a pH of about 7 to about 12. Outside of this range the bleaching performance falls off markedly. Since the aqueous solutions of the persalts or peracids of the present invention are generally acidic, it is necessary to maintain the requisite pH conditions by utilizing standard buffering agents. A buffering agent is defined as any non-interfering compound which can alter and/or maintain a specified pH. Useful buffers include phosphates, carbonates, or bicarbonates designed to buffer in the range of 7–12. Specific examples include sodium bicarbonate, sodium carbonate, disodium hydrogen phosphate, and disodium hydrogen phosphate. Buffering agents generally comprise about 1% to about 85% of the instant concentrated bleaching compositions.

Nonionic surfactants suitable for use herein include ethoxylated and propoxylated fatty alcohols, capped or uncapped. Typical nonionic surfactants are disclosed in U.S. Pat. No. 4,316,812 incorporated herein by reference.

Foam inhibition is important to increase dishwasher and laundry machine efficiency and minimize the destabilizing effects what may occur due to the presence of excess foam within the washer during laundering. The degree of foam is partly dependent on the hardness of the wash water where addition of builder salts, such as, NaTTP (sodium tripolyphosphate) which has a water softening effect may aid in providing a degree of foam inhibition. Particularly effective are silicones from Dow Chemical and the alkyl phosphoric acid esters derived from C12–C20 alkanols or ethoxylated alcohols. Commercially available examples of the latter are SAP from Hooker and LPKN from Knapsack.

Some examples of alkali metal detergent builder salts include the polyphosphates, e.g., alkali metal pyrophosphates, alkali metal tripolyphosphates, alkali metaphosphates and the like.

Low molecular weight polyacrylates in the range of about 1,000 about 100,000 can be used in conjunction with the builder salts. A preferred polyacrylate is Norasol LMW45ND sold by Norsohaas as is Acusol TM 640D from Rohm & Haas. These are employed in a range of about 0–15% or 0.1–10%.

Other useful low molecular weight noncrosslinked polymers are Acusol 640D sold by Rohm & Haas and Norasol QR1014 sold by Norshohaas having a GPC (gel permeationn chromatography) molecular weight of 10,000.

The compositions can also contain a nonphosphate builder system comprised of a mixture of phosphate-free particles formed from a builder salt and a low molecular weight polyacrylaate. A preferred solid builder salt is an alkali metal carbonate, such as, sodium carbonate or sodium citrate or a mixture thereof. When a mixture is used, a weight ratio of sodium carbonate to sodium citrate of about 9:1 to about 1:9 and preferably about 3:1 to about 1:3 is used.

The alkali metal silicates serve as anti-corrosion agents functioning to make the composition anti-corrosive to eating utensils and to automatic dishwashing machine parts. Sodium silicates of $Na_2/SiO_2$ ratios of from 1:1 to 1:3.4 especially about 1:2 to 1:3 are preferred. Potassium silicates of the same ratios can also be used. The preferred silicates are sodium disilicate (hydrated or anhydrous) and sodium metasilicate.

Thickening agents that can be used to ensure the physical stability of the suspension and to enhance its viscosity are those that will swell and develop thixotropic properties in a nonaqueous environment. These include organic polymers and inorganic and organic modified clays. Essentially, any clay can be used as long as it will swell in a nonaqueous environment and exhibits thixotropic properties. A preferred clay is bentonite. A swelling agent is used with the bentonite clay. A preferred swelling agent is a combination of propylene carbonate and tripropylene glycol methyl ether. However, any other substance that will cause bentonite to swell in a nonaqueous environment and to develop thixotropic properties can be used.

The nonaqueous liquid carrier materials that can be used for formulating nonaqueous liquid compositions include the higher glycols, polyglycols, polyoxides and glycol ethers. Examples are propylene glycol, polyethylene glycol, polypropylene glycol, diethylene glycol monoethyl ether, tripropylene glycol methyl ether, propylene glycol methyl ether acetate, and the like. A preferred nonaqueous carrier is polyethylene glycol 200 (PEG 200) or polyethylene glycol 300 (PEG 300).

The system that can be used in the instant compositions to ensure phase stability can comprise a finely divided silica, such as, Cab-O-Sil M5, Cab-O-Sil EH5 or Aerosil 200 used at a level of about 0 to about 4.0 weight % and preferably about 0.5 to about 3.0 weight %.

The detergent formulation can also contain a mixture of a proteolytic enzyme and an amylolytic enzyme and optionally, a lipolytic enzyme that serves to attack and remove the organic residues on glasses, plates, pots, pans, and other eating utensils. Proteolytic enzymes attack protein residues, lipolytic enzymes fat residues and amylolytic enzymes starches. Proteolytic enzymes include the protease enzymes subtilism, bromelin, papain, trypsin end pepsin. Amylolytic enzymes include amylase enzymes. Lipoiytic enzymes include the lipase enzymes. The preferred amylase enzyme is available under the name Maxamyl, derived from *Bacillus lichenformis*, from Gist-Brocades of the Netherlands in the form of a nonaqueous slurry (18% of enzyme) having an activity of about 40,000 TAU/g. Maxatase is a preferred protease enzyme.

Other conventional ingredients which may be included in these compositions in minor amounts, i.e., less than about 3 weight % include perfumes, hydrotropic agents, such as, sodium benzene, toluene, and cumene sulphonates, preservatives, dyestuffs, pigments and the like. Especially preferred for coloring are the chlorinated phthalocyanines and polysulfides of aluminosilicate which provide, respectively, green and blue tints. Titanium dioxide may be used for whitening or neutralizing off-shades.

The invention is further described in the examples that follow. All parts and percentages are by weight unless otherwise specified.

EXAMPLE 1

In order to test the efficacy of the claimed compositions, the following compositions were prepared and the described procedures performed.

A solution of 350 mg of potassium monopersulfate (Oxone) and 1000 ppm of NP Fab Ultra detergent in one liter of water was prepared to which was added 30 ppm of N-benzoyl-4-piperidone (BPIP).

Bleaching tests were performed in a six bucket (1-liter) terg-o-tometer at 80° F. and 120° F. Tests were run in tap water.

Dioxiranes were generated in situ by the addition of Oxone (0.35 g) and the N-acyl-piperidone to the terg-o-tometer which contained the Fab Ultra detergent. After ten seconds of agitation of the above solution, stained swatches were added to the solution and agitation was continued for 15 minutes. The stains were then rinsed in tap water, dried and their reflectance measured on a reflectometer to determine the average soil removal (% ASR).

The following four stained swatches were evaluated for bleaching in the test:

Grape juice on 65% Dacron/35% cotton

Blueberry pie on cotton percale

Red wine on a heavy cotton as a commercial stain sold by Test Fabrics as EMPA-114

Coffee and tea on percale

Determining the % Averaae Soil Removal

The % Average Soil Removal (% ASR) value is calculated by averaging the individual % Soil Removal (% SR) values of the four stains evaluated. The % Soil Removal (% SR) of a stained swatch was determined by manipulating its reflectance values which are measured from a swatch both before and after washing. A reflectance value is the amount of light that a surface (such as a swatch) will reflect. The following procedure will illustrate this protocol.

Coffee/Tea (Cotton Percal) stained swatches were bleached in the Dioxirane system (BPIP-Oxone) using the procedure above. Table A provides the measured reflectance values of the swatches without stain (No Soil), with the stain (Soiled), and after washing (Washed). For each stain there are two swatches evaluated in order that there be an average value calculated.

TABLE A

| | | Average of the Measured Values | | | |
|---|---|---|---|---|---|
| Stain | Fabric | No Soil | Soiled | Washed | % SR |
| Coffee/Tea | Cotton Percal | 92.00 | 80.48 | 90.12 | 83.69 |

The % SR value for the coffee/tea stained swatch is calculated by inserting the average of the measured reflectance values into the equation presented below.

$$\% SR = \frac{(\text{Washed} - \text{Soiled})}{(\text{No Soil} - \text{Soil})} \frac{(90.12 - 80.48)}{(92.00 - 80.48)} = 83.69$$

The % SR value for the coffee/tea stained swatch at 70° F. is 83.69. To obtain the % ASR value, the individual % SR values of all four stains were added up and the sum is divided by four as shown in Table B below where the % ASR value for the BPIP/Oxone (30/350 ppm) system is shown to be 59.59.

TABLE B

| System | Grape Juice % SR | Blueberry Pie % SR | Red Wine Empa-114 % SR | Coffee/Tea % SR | % ASR |
|---|---|---|---|---|---|
| BPIP/Oxone (30/350 ppm) | 34.92 | 71.11 | 48.66 | 83.69 | 59.59 |

This protocol is usually done in replicates of two or three to provide an overall average value and standard deviation as illustrated in Tables 1 through 4.

Tables 1 and 2 contain the % Soil Removal Values obtained at 70° F. and 100° F. respectively for Oxone alone at a concentration of 350 ppm (Control), Oxone (350 ppm) plus 30 ppm of N-benzoyl-4-piperidone (BPIP), a dioxirane of this invention. Oxone (350 ppm) plus 30 ppm of cyclohexanone and Oxone (350 ppm) plus 100 ppm of cyclohexanone. These data show that the BPIP/Oxone system is superior to that of cyclohexanone/Oxone system at both 70° F. and 100° F.

The observation of the inferiority of cyclohexanone to BPIP was extended to show that this was not an isolated one but that not all members of the class, cyclic ketones, exhibit activation of the bleaching powers of the peroxygen bleaching compounds of this invention. Some show no boost in the bleaching performance of Oxone and others actually inhibit or deactivate the bleaching performance of Oxone. Thus 2,2,6,6-tetramethyl-4-piperidone (TMP) at levels ranging from 10 ppm to 100 ppm per 350 ppm of Oxone is shown in Table 3 to produce no boost in Oxone bleaching performance.

TABLE 1

Bleach performance of the BPIP/Oxone system (30/350 ppm) is superior to that of cyclohexanone at the same concentration at 70° F.

| System | Grape Juice (65D/35C) | Blueberry Pie (Cotton Per) | Red Wine* Empa-114 (Heavy Cotton) | Coffee/Tea (Cotton Per) | Average of 4-Stains |
|---|---|---|---|---|---|
| Oxone (350 ppm) | 24.4 ± 2.4 | 53.4 ± 1.2 | 38.2 ± 1.5 | 42.4 ± 6.7 | 39.6 ± 1.2 |
| BPIP/Oxone (30/350 ppm) | 35.2 ± 0.4 | 70.5 ± 0.9 | 48.1 ± 0.7 | 82.0 ± 2.3 | 58.9 ± 0.9 |
| Cyclo/Oxone 30/350 ppm) | 27.5 ± 3.5 | 55.5 ± 2.5 | 40.1 ± 1.0 | 52.7 ± 2.1 | 43.9 ± 1.3 |
| Cyclo/Oxone (100/350 ppm) | 34.5 ± 0.3 | 65.6 ± 1.4 | 44.9 ± 1.8 | 79.4 ± 0.3 | 56.3 ± 0.9 |

TABLE 2

Bleach performance of the BPIP/Oxone system (30/350 ppm) is superior to that of cyclohexanone at the same concentration at 100° F.

| System | Grape Juice (65D/35C) | Blueberry Pie (Cotton Per) | Red Wine* Empa-114 (Heavy Cotton) | Coffee/Tea (Cotton Per) | Average of 4-Stains |
|---|---|---|---|---|---|
| Oxone (350 ppm) | 28.9 ± 4.0 | 65.2 ± 1.6 | 45.9 ± 0.6 | 57.9 ± 2.2 | 49.6 ± 0.4 |
| BPIP/Oxone (30/350 ppm) | 43.4 ± 3.2 | 76.4 ± 0.2 | 58.2 ± 1.9 | 91.0 ± 1.3 | 67.2 ± 1.0 |
| Cyclo/Oxone (30/350 ppm) | 35.4 ± 1.3 | 68.5 ± 0.9 | 52.3 ± 0.1 | 86.6 ± 0.3 | 60.9 ± 0.0 |
| Cyclo/Oxone (100/350 ppm) | 51.7 ± 0.7 | 79.1 ± 0.3 | 59.3 ± 2.2 | 95.5 ± 1.8 | 71.4 ± 0.9 |

In Table 4 it is illustrated that the bleaching performance of Oxone at 350 ppm is significantly reduced in the presence of the cyclic ketone, N-methyl-4-piperidone (M-PIP) over an increasing range of from 10 to 100 ppm at 80° F.

TABLE 3

The Bleach performance of Oxone is not potentiated in the presence of 2,2,6,6-tetramethyl piperidone (TMP) at 80° F.

| System | Grape Juice (65D/35C) | Blueberry Pie (Cotton Per) | Red Wine* Empa-114 (Heavy Cotton) | Coffee/Tea (Cotton Per) | Average of 4-Stains |
|---|---|---|---|---|---|
| TMP/Oxone (100/350 ppm) | 36.4 ± 0.1 | 59.2 ± 1.3 | 38.5 ± 1.8 | 35.5 ± 2.5 | 41.8 ± 1.4 |
| TMP/Oxone (50/350 ppm) | 34.1 ± 1.1 | 61.1 ± 0.9 | 40.3 ± 1.8 | 35.8 ± 1.3 | 42.8 ± 0.1 |
| TMP/Oxone (30/350 ppm) | 35.1 ± 1.4 | 61.4 ± 0.4 | 39.0 ± 3.4 | 32.4 ± 0.3 | 41.9 ± 1.0 |
| TMP/Oxone (10/350 ppm) | 36.6 ± 0.2 | 62.7 ± 1.4 | 41.1 ± 0.4 | 17.8 ± 13.0 | 39.5 ± 3.7 |
| Oxone (350 ppm) | 39.4 ± 0.7 | 57.8 ± 1.2 | 39.1 ± 1.8 | 24.4 ± 0.5 | 39.4 ± 0.7 |

TABLE 4

The bleach performance of Oxone is actually reduced in the presence of N-methyl-4-piperidone (M-PIP) at 80° F.

| System | Grape Juice (65D/35C) | Blueberry Pie (Cotton Per) | Red Wine* Empa-114 (Heavy Cotton) | Coffee/Tea (Cotton Per) | Average of 4-Stains |
|---|---|---|---|---|---|
| M-PIP/Oxone (100/350 ppm) | 31.0 ± 0.4 | 50.5 ± 0.5 | 30.1 ± 0.6 | 52.9 ± 1.8 | 41.1 ± 0.8 |
| M-PIP/Oxone (50/350 ppm) | 31.1 ± 1.5 | 51.5 ± 0.0 | 30.5 ± 0.5 | 55.3 ± 4.9 | 42.3 ± 1.7 |
| M-PIP/Oxone (30/350 ppm) | 33.6 ± 0.9 | 54.9 ± 0.2 | 32.4 ± 0.6 | 50.7 ± 0.8 | 45.2 ± 0.2 |
| M-PIP/Oxone (10/350 ppm) | 36.3 ± 0.1 | 56.6 ± 0.5 | 34.1 ± 1.1 | 62.6 ± 4.3 | 47.4 ± 0.9 |
| Oxone (350 ppm) | 39.6 ± 0.2 | 61.1 ± 0.6 | 38.0 ± 0.7 | 56.2 ± 1.3 | 48.7 ± 0.0 |

Although the preferred N-acyl 3- or 4-piperididones of this invention are N-benzoyl-3-piperidone or N-benzoyl-4-piperidone, the invention is not limited to these specific piperidones. Other piperidones which are usefuil for peroxygen bleaching activation include but are not limited to N-formyl-3-piperidone, N-formyl-4-piperidone, N-acetyl-3-piperidone, N-acetyl-4-piperidone, N-propionyl-3-piperidone, N-propionyl-4-piperidone, N-stearyl-3-piperidone, N-stearyl-4-piperidone as well as N-acyl 3- or 4-piperidones where R in the generic formula on page 3 are benzyl, xylyl, phenylethyl, amino, substituted amino and live groups.

The compositions of this invention inhibit dye transfer from taking place from aqueous media in which soiled fabrics are being cleaned by the bleaching of the fabrics.

Although the invention has been described with a certain amount of particularity, it is understood that the present disclosure of the preferred forms has been made only by way of example and that numerous changes and modifications can be made without departing from the spirit and scope of the invention.

What is claimed is:

1. A method for activating a peroxygen bleach compound present in aqueous solution which comprises adding an effective amount of an activator to the said aqueous solution; wherein the said activator has the formula:

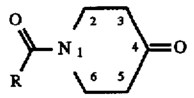

1 wherein the carbonyl function, >C=O, can be located at either the 3 or 4 position of the piperidone ring, R is hydrogen, an aryl monovalent group having 6 to about 10 carbon atoms, an alkyl group having 1 to about 18 carbon atoms, alkaryl or aralkyl group having about 7 to about 20 carbon atoms, or a nitrogen substituted hydrocarbyl group, and the piperidone ring atoms can be mono- or disubstituted by one or more groups defined by R.

2. A method according to claim 1 wherein said peroxygen bleaching compound is a monopersulfate salt.

3. The method claimed in claim 2 wherein the monopersulfate is potassium monopersulfate.

4. The method claimed in claim 1 wherein the activator is an N-acyl-4-piperidone.

5. The method claimed in claim 4 wherein the N-acyl-4-piperidone is N-benzoyl-4-piperidone.

6. A peroxygen bleaching composition which comprises by weight a mixture of:

(A) about 1 to about 75% of a peroxygen bleaching compound; and (B) about 1 to about 75% of a peroxygen bleaching compound activator having the formula:

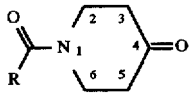

wherein the carbonyl function, >C=O, can be located at either the 3 or 4 position of the piperidone ring, R is hydrogen, an aryl monovalent group having 6 to about 10 carbon atoms, an alkyl having 1 to about 18 carbon atoms, alkaryl or aralkyl group having about 7 to about 20 carbon atoms, or a nitrogen substituted substituted hydrocarbyl group, and the other piperidone ring atoms can be mono- or disubstituted by one or more groups defined by R.

7. The composition claimed in claim 6 wherein each of said peroxygen bleaching compound and said peroxygen bleaching compound activator is present in an amount of about 5 to about 60% by weight.

8. The composition claimed in claim 6 wherein each of said peroxygen bleaching compound and said bleaching compound activator is present in an amount of about 5 to about 50% by weight.

9. The composition claimed in claim 6 wherein said mixture is dissolved in water at concentration of about 0.05 to about 10 grams of said mixture per liter of water.

10. The composition claimed in claim 6 further including at least one member selected from the group consisting of: anti-foam agents, thickening agents, surfactants, fabric softening agents, anti-static agents, stabilizing agents, buffering agents, inorganic builder salts, suspending and anti-depositing agents, alkali metal silicates, enzymes, anti-corrosion agents, preservatives, dyestuffs and pigments.

11. The composition claimed in claim 6 wherein said peroxygen bleaching compound is an inorganic peroxygen bleaching compound.

12. The composition claimed in claim 11 wherein said inorganic peroxygen bleaching compound is potassium monoperoxysulfate.

13. The composition claimed in claim 11 further including at least one non-aqueous liquid carrier and the mixture of said inorganic peroxygen bleaching compound and peroxygen bleaching activator is present at a concentration of about 0.05 to about 10% by weight.

14. The composition claimed in claim 6 wherein said peroxygen bleaching compound activator is an N-acyl-4-piperidone.

15. The composition claimed in claim 14 wherein said N-acyl-4-piperidone is N-benzoyl-4-piperidone.

16. The composition claimed in claim 6 further including an aqueous carrier.

17. A bleaching composition comprising water and about 10 to about 1,000 ppm of a composition according to claim 6.

18. The bleaching solution claimed in claim 17 including at least member selected from the group consisting of: anti-foam agents, thickening agents, surfactants, fabric softening agents, anti-static agents, stabilizing agents, buffering agents, inorganic builder salts, suspending and anti-depositing agents, alkali metal silicates, enzymes, anti-corrosion agents, preservatives, dyestuffs and pigments.

19. A method for cleaning soiled fabrics by bleaching which comprises adding to an aqueous wash liquor the composition claimed in claim 6 in an amount sufficient to clean said soiled fabrics.

20. A method for inhibiting dye transfer from taking place from the aqueous medium in which soiled fabrics are cleaned by bleaching of the fabrics which comprises adding to the aqueous washing medium an amount of the composition of claim 6 sufficient to inhibit dye transfer.

21. A method for removing stains on hard surfaces which comprises contacting said hard surfaces with an effective bleaching amount of a composition according to claim 6.

22. A method according to claim 21 wherein said composition is present in an aqueous medium.

* * * * *